United States Patent
Serventi et al.

(10) Patent No.: US 7,936,084 B2
(45) Date of Patent: May 3, 2011

(54) SYSTEM AND METHOD FOR ELECTRIC POWER DISTRIBUTION INSIDE AN AIRCRAFT

(75) Inventors: Pascal Serventi, Leguevin (FR); Guillaume Larroque, Monbrun (FR)

(73) Assignee: Airbus France, Toulouse (FR)

( * ) Notice: Subject to any disclaimer, the term of this patent is extended or adjusted under 35 U.S.C. 154(b) by 255 days.

(21) Appl. No.: 12/297,280

(22) PCT Filed: Apr. 5, 2007

(86) PCT No.: PCT/EP2007/053372
§ 371 (c)(1),
(2), (4) Date: Oct. 15, 2008

(87) PCT Pub. No.: WO2007/128637
PCT Pub. Date: Nov. 15, 2007

(65) Prior Publication Data
US 2009/0167076 A1     Jul. 2, 2009

(30) Foreign Application Priority Data

May 4, 2006   (FR) ...................................... 06 51597

(51) Int. Cl.
*B60L 1/00*       (2006.01)
*B60L 3/00*       (2006.01)
*H02G 3/00*       (2006.01)

(52) U.S. Cl. ............................ 307/9.1; 307/34; 307/115
(58) Field of Classification Search ................... 307/34, 307/9.1, 115
See application file for complete search history.

(56) References Cited

U.S. PATENT DOCUMENTS

| | | | |
|---|---|---|---|
| 5,612,579 A | | 3/1997 | Wisbey et al. |
| 5,936,318 A | | 8/1999 | Weiler et al. |
| 6,798,630 B1 | | 9/2004 | Del Vecchio et al. |
| 2002/0064010 A1 | | 5/2002 | Nelson et al. |
| 2003/0047997 A1 | * | 3/2003 | Bernier ........................ 307/9.1 |
| 2003/0212513 A1 | | 11/2003 | Vandevanter et al. |
| 2005/0097373 A1 | | 5/2005 | Stoupis et al. |
| 2006/0042846 A1 | * | 3/2006 | Kojori et al. ................. 180/65.8 |

* cited by examiner

*Primary Examiner* — Jared J Fureman
*Assistant Examiner* — Carlos Amaya
(74) *Attorney, Agent, or Firm* — Oblon, Spivak, McClelland, Maier & Neustadt, L.L.P.

(57) ABSTRACT

A system and a method for distribution of electric power inside an aircraft. The system includes at least two systems distributing electric power from at least one power source to electric loads of the aircraft via electric and/or electronic protection/switching components, the components being configurable and commandable by dedicated electronics. Each electric distribution system includes command electronics in which a configuration file is downloaded allocating an installation status to each of the protection/switching components.

19 Claims, 1 Drawing Sheet

SYSTEM AND METHOD FOR ELECTRIC POWER DISTRIBUTION INSIDE AN AIRCRAFT

TECHNICAL AREA

The present invention concerns a system and a method to distribute electric power inside an aircraft.

In the remainder hereof, to simplify the description, consideration is given to an aircraft of airplane type.

STATE OF THE PRIOR ART

At the present time in known prior art systems, any change in the configuration of electric protections in an airplane requires:

either manual activation of a protection by circuit breaking, whether or not this protection comprises overcurrent detection and control electronics, and the downloading of databases associated with the unit which manages electric loads, or the downloading of all the databases of the electronic protection/switching components of the electric power distribution system.

These electric protections may be of different types: $I_2t$ (overcurrent protection), GFI (Ground Fault Interruption), AFD (Arc Fault Detection).

The basic function of the electric power distribution system in an airplane is effectively to distribute power from a power source to an electric load and to protect the integrity of cabling between this source and this load against overheating due to overcurrents exceeding the electric consumption of this load on which protection was calculated. Said protection is ensured by a fuse-type component, if it is not resettable, or by a component of circuit breaker type if it is resettable.

On last-generation airplanes, electronic circuit breakers are used. Specific measurement and overcurrent detection electronics can then integrate complex control and circuit-breaking logics and be connected to a shared communication network throughout the entire airplane. Circuit-breaking electronics can use either using relay-type components for high-consumption loads (greater than 15A), said components then being components of RCCB type (Remote Controlled Circuit Breaker) also called CPD (Commutation and Protection Device), or by transistor-based power electronic components, said components then being electronic protection/switching devices of the SSPC type (Solid State Power Controller). These electronic protection/switching devices are concentrated and integrated inside the airplane's distribution centres (equivalent to electric distribution boxes).

In each of these electric distribution centres, each of these electronic protection/switching devices is programmed by software via a database defining the essential parameters for its functioning such as the rules for defining overcurrent relative to the consumption of the load concerned (gauge), the name of the powered load, its position within the electric centre, its status (closed/open), its installation status (load presence or absence in the airplane), its control logic.

Maintenance tasks connected with the configuration of a protection/switching component at the time of installing new equipment require modification of cabling and the downloading of databases for the electric distribution system and adjacent systems. Said modification leads to a series of heavy, costly tasks requiring immobilization of the airplane and recourse to manufacturer and/or supplier assistance services, the design involved being a complementary activity.

The object of the invention is to solve said technical problem by allowing the activation or deactivation of electric power supplies to the electrical systems linked with the use of electronic protection/switching components, without having to apply downloading procedures of on-board software associated with a global airplane configuration.

DESCRIPTION OF THE INVENTION

The invention concerns an electric power distribution system inside an aircraft, comprising at least two systems to distribute electric power from at least one power source towards the electric loads of this aircraft, via electric and/or electronic protection/switching components, these components being configurable and controllable by dedicated electronics, characterized in that each electric distribution system comprises command electronics in which a configuration file is downloaded allocating an installation status to each of the protection/switching components.

Advantageously, an installation status is hard encoded in each of the configuration files, for each electric load.

Advantageously each electric load is identified as "configurable normal" or "configurable plug and fly" in a configuration database of the airplane, a default installation status being allocated to each load via a configuration file.

Advantageously, for a load identified as "configurable normal", the installation status is set at a fixed value which is the default value. For a load identified as "configurable plug and fly", the installation status is a variable parameter in relation to the command arriving from an interface and in relation to the default value.

Advantageously, the system of the invention comprises an interface consisting of a terminal part, for data display and entry, and an intelligence part for control over the electric statuses of the electronic protection/switching components. This interface comprises means to send at least one install or uninstall command for the dynamic modification of a programmed installation status.

Advantageously the aircraft is an airplane.

The invention also concerns a method for the distribution of electric power inside an aircraft, in which electric power is distributed from at least one power source by means of at least two electric distribution systems, towards electric loads of this aircraft via electric and/or electronic protection/switching components, these components being configurable and commandable by dedicated electronics, characterized in that a configuration file is downloaded which, to each of the protection/switching components, allocates an installation status in the command electronics of each distribution system.

Advantageously, an installation status is hard encoded in each of the configuration files, for each of the electric loads. Each electric load is identified as "configurable normal" or "configurable plug and fly".

Advantageously, a default installation status is allocated to each load. For a load identified as "configurable normal", the installation status is set at a fixed value which is the default value. For a load identified as "configurable plug and fly", the installation status is a variable parameter related to the command arriving from the interface and to the default value.

Advantageously, the interface gives an install/uninstall command:

if the load is identified in the database as "Configurable normal", the interface does not authorize access to an install/uninstall command and alerts the operator thereof.

if the load is identified as "Configurable Plug and Fly", the interface proposes access to a command page allowing modification of the installation status of the electric protection.

The invention also concerns an aircraft comprising said system, and an aircraft comprising a system able to implement said method.

The invention allows the possibility of pre-cabling. It allows activation of the electric systems and the communication data associated therewith, via a specific man/machine interface in accordance with client needs.

Additionally, the invention allows maintenance costs to be reduced, notably at client/airplane user level. It effectively enables shorter immobilization of the airplane and client independence relative to manufacturer and/or supplier assistance.

Finally, the invention allows installation errors to be avoided, since it does not require action on the equipment of the airplane.

DETAILED DESCRIPTION OF PARTICULAR EMBODIMENTS

Figure 1:
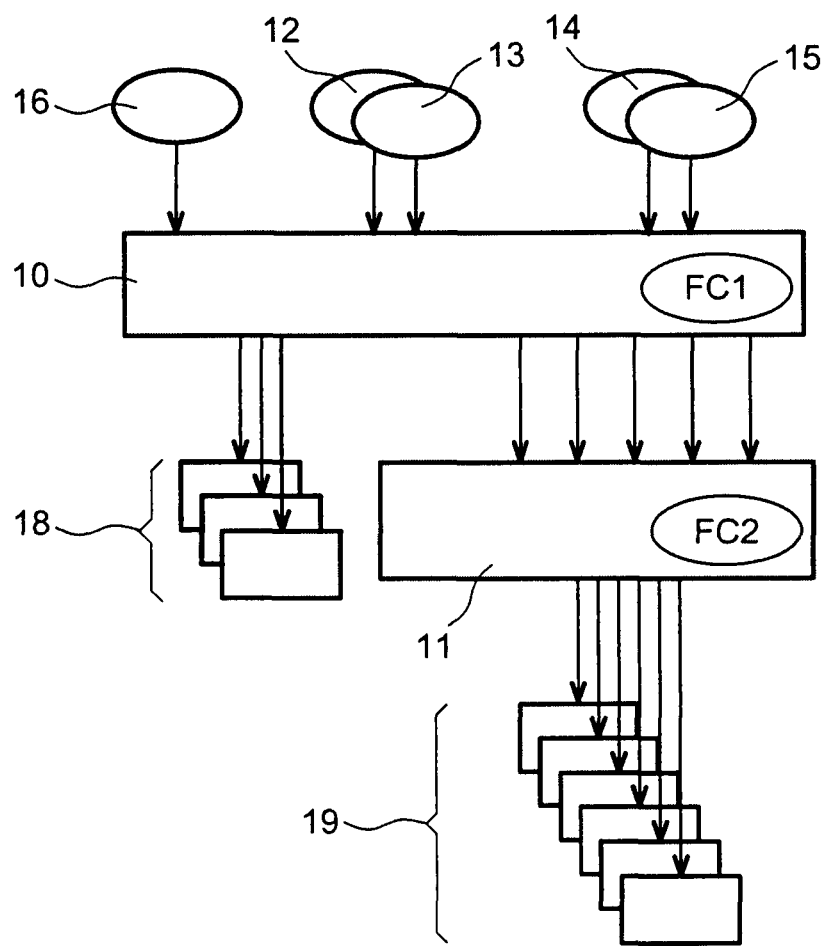
FIG. 1 illustrates a system for the distribution of electric power inside an aircraft according to the invention.

FIG. 1 illustrates the electric distribution system of an airplane, whose function is to supply electric power to all the airplane's electrical loads (equipment) or electricity consumption. This system comprises a primary electric distribution system 10 and a secondary electric distribution system 11.

The primary distribution system 10 is supplied by generators 12, 13, 14 and 15, and optionally by an auxiliary source 16.

The secondary distribution system 11 is supplied by this primary distribution system 10. Each of these distribution systems 10 and 11 supplies electric loads: high-consumption electric loads 18 and low-consumption electric loads 19 respectively.

In each of these two systems, according to the invention, a configuration file is shown, FC1 and FC2 respectively, which derives from the airplane's configuration management tools.

The function of the primary electric distribution system 10 is therefore:
  to manage the airplane's general electric circuit in relation to the availability of electric power generators 12, 13, 14 and 15 via power contactors/switches,
  to distribute electric power towards the airplane's heavy power consumers such as the kerosene pumps, flight command actuators, by means of protection/switching components of RCCB type, which are configurable electromechanical components which can be commanded by dedicated electronics,
  to distribute electric power towards the secondary electric distribution system 11.

The function of the secondary distribution system 11, is therefore:
  to distribute electric power towards all the airplane's low-consumption electric loads (such as avionics computers) via high density distribution lines through the use of electronic protection/switching components of SSPC type, which are purely electronic components that are configurable and controllable by dedicated electronics,
  to command these electronic protection/switching components so that electric loads are or are not powered in relation to a pre-established logic.

According to the invention, the electronic protection/switching components are configured electronically via configuration files FC1 and FC2. These configuration files FC1 and FC2 are databases downloaded into the command electronics of the secondary and primary systems 10 and 11, enabling the allocation of characteristics to each electronic protection/switching component which will allow each component to manage the associated electric supply line. The installation status of an electronic protection/switching component is a configuring characteristic of the airplane.

Figure 2:
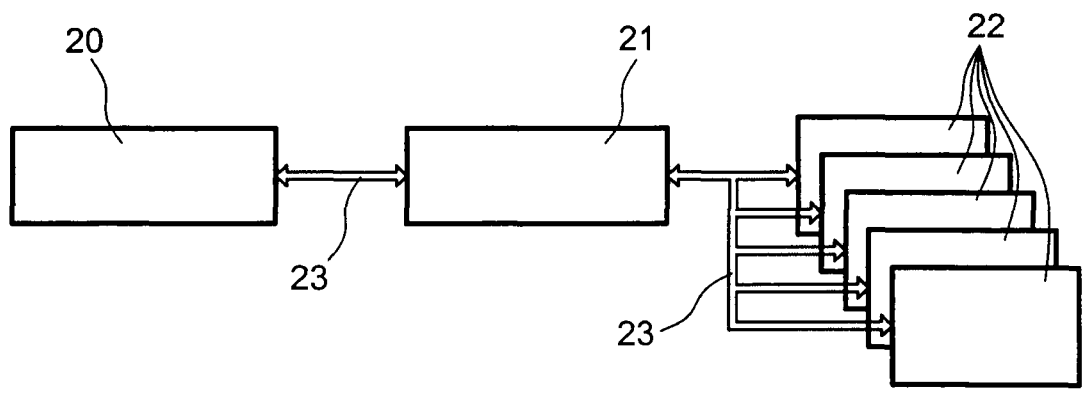
FIG. 2 illustrates the interface system and the distribution centres in the system of the invention.

As illustrated FIG. 2, the man/machine interface used to implement the invention is an interface consisting of a "terminal" part 20, for data display and entry, and an "intelligence" part 21, to control the electric statuses of the electronic protection/switching components of the electric distribution centres 22 via a bi-directional communication bus 23.

With the invention it is therefore possible to activate or deactivate electric supplies and associated electric functions (BITE—Built In Test Equipment, trigger detection, switching function, cockpit alarms, etc. . . . ) without having to carry out heavy maintenance tasks, by installing the new electronic protection/switching components and downloading modified databases for all equipment.

Example of One Embodiment

In the invention, each electric load is identified as "configurable normal" or "Configurable Plug and Fly" in the airplane's configuration database, a default installation status being allocated to it via the configuration file.

The "Plug and Fly" concept, similar to the "Plug and Play" concept in data processing, allows an electric load that is newly connected to an electric circuit to be used with minimum reconfiguring operations of the electric distribution system and minimum changes to cabling after it has been physically installed. The electronic protection/switching components are therefore pre-installed in the electric distribution systems and pre-programmed with respect to the load that the system is intended to supply. Activation of the electric distribution line does not require heavy maintenance but solely software activation via the interface allowing communication of commands and the recovery of data from the electric distribution centres.

For each electric load of "Configurable Plug and Fly" type, the electric distribution centre under consideration calculates the installation status of the associated electronic protection/switching component from a default status defined in the configuration file and from the commands received from the interface. The electric centre can then communicate this installation status to all the electric systems concerned.

For each electric load of "configurable normal" type, the electric distribution centre under consideration solely takes into account the default status to establish the installation status of the associated protection/switching component. Any install commands arriving from the interface for this load are ignored.

In the electric distribution systems, an installation status is hard encoded i.e. "installed"/"non-installed", in each of the load configuration files as follows:

A default value of the installation status of each electric load is defined in the configuration files generated by the configuration management tools provided by the airframe manufacturer.

For each electric load identified as "configurable normal", the installation status is frozen at a set value which is the default value.

For each electric load identified as "Configurable Plug and Fly", the installation status is a variable parameter with a value allocated in relation to the command arriving from the interface and in relation to the default value.

If an installation status is configured as "non-installed", protection is forced on opening by the electric distribution centre.

The interface, illustrated FIG. 2, is used to control the electronic protection/switching components for their securing when in open position. This allows the electric power supply to be cut off downstream for fully secure operator action. The interface also allows the resetting of an electronic protection/switching component after its trip function has compelled it to open.

This interface has an additional function enabling it to send an install or uninstall command, for dynamic modification of the installation status programmed in the database of the electric centres.

The configuration files of the interface also contain the type of electric load associated with the protection of the electric distribution centre, namely "Configurable normal" or "Configurable Plug and Fly".

The electric installation status of the electronic protection/switching components in the database of the interface receives information dynamically from a communication derived from the electric distribution centres.

The functioning of the interface enabling transmission of the electric protection install/uninstall command is as follows:

if the load is identified in the database as "Configurable normal", the interface does not authorize access to an install/uninstall command page and alerts the operator thereof. In parallel, the command intelligence of the interface prohibits any install command.

if the load is identified as "Configurable Plug and Fly", the interface proposes access to a command page allowing modification of the installation status of the electric protection. In parallel, the command intelligence of the interface allows the sending of an install or uninstall command.

The possibility of modifying the installation status of a protection/switching component of a "Plug and Fly" load is only offered when the aircraft is on the ground, the security consequences of the arbitrary uninstalling of a large number of electronic protection/switching components possibly being of major importance.

Variants of Embodiment

The invention can be applied to all electric loads of an airplane that are protected by electronic protections with high precautionary constraints: operating redundancy, permanent verification of software integrity to avoid common failure modes.

The invention can be applied to so-called conventional protection technologies not associated with software integration. In this case, the logics are obtained by cabling and relays.

The invention can also be applied to the activation of functions for power supply logics integrated in the databases. This allows the inhibition or automatic activation of functions according to missions considered or chosen for the aircraft. It can for example be chosen whether or not to activate the power supply logics associated with the use of electric loads to ensure an airplane mission e.g. of the type Air to Air Refueling, Aerial delivery, . . . .

The invention can also be applied to the activation or deactivation of protection functions (GFI, AFD) specific to SSPC and RCCB protections in relation to the needs of the connected equipment.

The invention claimed is:

1. A system for distribution of electric power inside an aircraft, comprising:

at least two systems to distribute electric power from at least one power source to electric loads of the aircraft via electric and/or electronic protection/switching components, the components being configurable and commandable by dedicated electronics, wherein each electric distribution system includes the dedicated electronics in which a configuration file is downloaded, the configuration file allocates an installation status to each of the protection/switching components, and the installation status indicates whether a command from a terminal is allowed to change a value of a parameter associated with the corresponding protection/switching components.

2. The system according to claim 1, wherein the installation status is hard encoded in each of the configuration files, for each of the electric loads.

3. The system according to claim 2, wherein each electric load is identified as configurable normal or configurable plug and fly in a configuration database of the aircraft.

4. The system according to claim 3, wherein a default installation status is allocated to each electric load via the configuration file.

5. The system according to claim 4, wherein, for an electric load identified as configurable normal, the installation status is set at a fixed value that is a default value.

6. The system according to claim 5, wherein, for an electric load identified as configurable plug and fly, the installation status is a variable parameter in relation to the command arriving from the terminal and in relation to a default value.

7. The system according to claim 1, further comprising an interface including the terminal, which allows data display and entry, and an intelligence part, which allows commanding of the installation statuses of the electronic protection/switching components.

8. The system according to claim 7, wherein the interface further includes means for sending at least one install or uninstall command enabling dynamic modification of a programmed installation status.

9. The system according to claim 7, wherein the aircraft is an airplane.

10. A method for distribution of electric power inside an aircraft, comprising:

distributing electric power from at least one power source by at least two electric distribution systems towards electric loads of the aircraft via electric and/or electronic protection/switching components, the components being configurable and commandable by dedicated electronics; and downloading a configuration file to each of the protection/switching components, the configuration file allocates an installation status to each of the protection/switching components, and the installation status indicates whether a command from a terminal is allowed to change a value of a parameter associated with the corresponding protection/switching components.

11. The method according to claim 10, wherein the installation status is hard encoded in each of the configuration files, for each of the electric loads.

12. The method according to claim 11, wherein each electric load is identified as configurable normal or configurable plug and fly.

13. The method according to claim 12, wherein a default installation status is allocated to each electric load.

14. The method according to claim 13, wherein, for each electric load identified as configurable normal, the installation status is set at a fixed value that is a default value.

15. The method according to claim 13, wherein, for each electric load identified as configurable plug and fly, the installation status is a variable parameter in relation to the command arriving from the terminal and in relation to a default value.

16. The method according to claim 15, wherein the terminal gives an install/uninstall command:
- if the load is identified as configurable normal, the interface does not authorize access to an install/uninstall command page and alerts the operator thereof,
- if the load is identified as configurable plug and fly, the interface proposes access to a command page allowing modification of the installation status of the protection/switching components.

17. The method according to claim 10, wherein the aircraft is an airplane.

18. An aircraft comprising:
at least two systems to distribute electric power from at least one power source to electric loads of the aircraft via electric and/or electronic protection/switching components, the components being configurable and commandable by dedicated electronics, wherein
each electric distribution system includes the dedicated electronics in which a configuration file is downloaded, the configuration file allocates an installation status to each of the protection/switching components, and the installation status indicates whether a command from a terminal is allowed to change a value of a parameter associated with the corresponding protection/switching components.

19. An aircraft comprising:
a system configured to
distribute electric power from at least one power source by at least two electric distribution systems towards electric loads of the aircraft via electric and/or electronic protection/switching components, the components being configurable and commandable by dedicated electronics, and
download a configuration file to each of the protection/switching components, the configuration file allocating an installation status to each of the protection/switching components, and the installation status indicating whether a command from a terminal is allowed to change a value of a parameter associated with the corresponding protection/switching components.

* * * * *